Dec. 8, 1970     F. F. HILTZ     3,546,601
NEURONAL EVENT RECOGNIZER
Filed Jan. 22, 1968                                    2 Sheets-Sheet 1

INVENTOR
FREDERICK F. HILTZ

J.O. Tresansky
ATTORNEY

United States Patent Office 3,546,601
Patented Dec. 8, 1970

3,546,601
NEURONAL EVENT RECOGNIZER
Frederick F. Hiltz, Kensington, Md., assignor, by mesne assignments, to the United States of America as represented by the Secretary of the Navy
Filed Jan. 22, 1968, Ser. No. 699,726
Int. Cl. H03k 5/20
U.S. Cl. 328—116     10 Claims

ABSTRACT OF THE DISCLOSURE

The present invention generally relates to circuit apparatus capable of detecting and properly identifying opposite polarity pulses of a complex input pulse waveform and, more particularly, which is adapted for use as an analog type neuronal event recognizer capable of being used "on-line" to accurately detect and identify subthreshold, intracellular neuronal activity, including both excitatory and inhibitory events. More specifically, the proposed circuit apparatus comprises a pair of detection channels each assigned to detect the occurrence of one polarity of input pulse and to provide a suitable output demarcating pulse each time its associated polarity input pulse occurs. Moreover, means are provided in each of the detection channels for producing outputs indicative of both the rise time and amplitude of the corresponding polarity of input pulse. Another important feature of the proposed apparatus is that the detection channels are interconnected so that the trailing edge of one polarity of input pulse will not cause the other detection channel to produce a faulty indication that the opposite polarity input pulse is occurring.

BACKGROUND OF THE INVENTION

At the present time, considerable effort is taking place in neurophysiological studies, dealing with, for example, intracellular neuronal activity, including both excitatory and inhibitory events. Such neuronal studies involves the monitoring of a complex electrical signal representing postsynaptic potential variations and, in order to be valuable, requires that this complex electrical signal or waveform be analyzed to properly detect and identify the various neuronal activities represented thereby. Heretofore, a general purpose digital computer type device was utilized for recognizing these neuronal events and required the steps of making a data tape of the complex input data signal; digitizing the tape information; and, then processing the data with a digital computer.

DESCRIPTION OF THE INVENTION

On the other hand, the proposed apparatus of the present invention is an analog type device capable of being used "in-line" as a neuronal event recognizer and thereby obviating the need for first making a data tape, subsequently digitizing the tape information; and, then processing it in the digital type recognizer heretofore outlined. In other words, the apparatus proposed in accordance with the present invention saves considerable time in the reduction and analysis of such input data. It should be understood at this time that although the previous discussion has considered the use of the proposed apparatus as an analog type neuronal event recognizer, the present invention may be used wherever it is desirable to detect and identify closely spaced, same or opposite polarity pulse activity in a complex input pulse waveform. For example, the unit may be employed to aid in the discrimination of neuronal pulses of an extracellular nature emanating from various sources. It may also be used as an aid in the reduction and analysis of EKG waveforms.

Another object of the present invention is to provide pulse input data recognition circuit apparatus capable of not only producing output signals demarcating respectively the occurrence of closely spaced, opposite polarity input pulses, but, also capable of producing further output signals representative of the amplitude and rise time of each input pulse.

Another object of the present invention is to provide pulse recognition circuit apparatus comprising two pulse detection channels each assigned to detect and demarcate the occurrence of a predetermined polarity of input pulse activity in a complex input waveform and interconnected such that the trailing edge of one polarity of input pulse is prevented from giving a faulty indication that the opposite polarity pulse has occurred.

Another object of the present invention is to provide circuit apparatus particularly adapted for detecting and analyzing complex input pulse data representative of bioelectric activities.

Other objects, purposes and characteristic features of the present invention will in part be pointed out as the description of the present invention progresses and in part be obvious from the accompanying drawings, in which.

Figure 1:
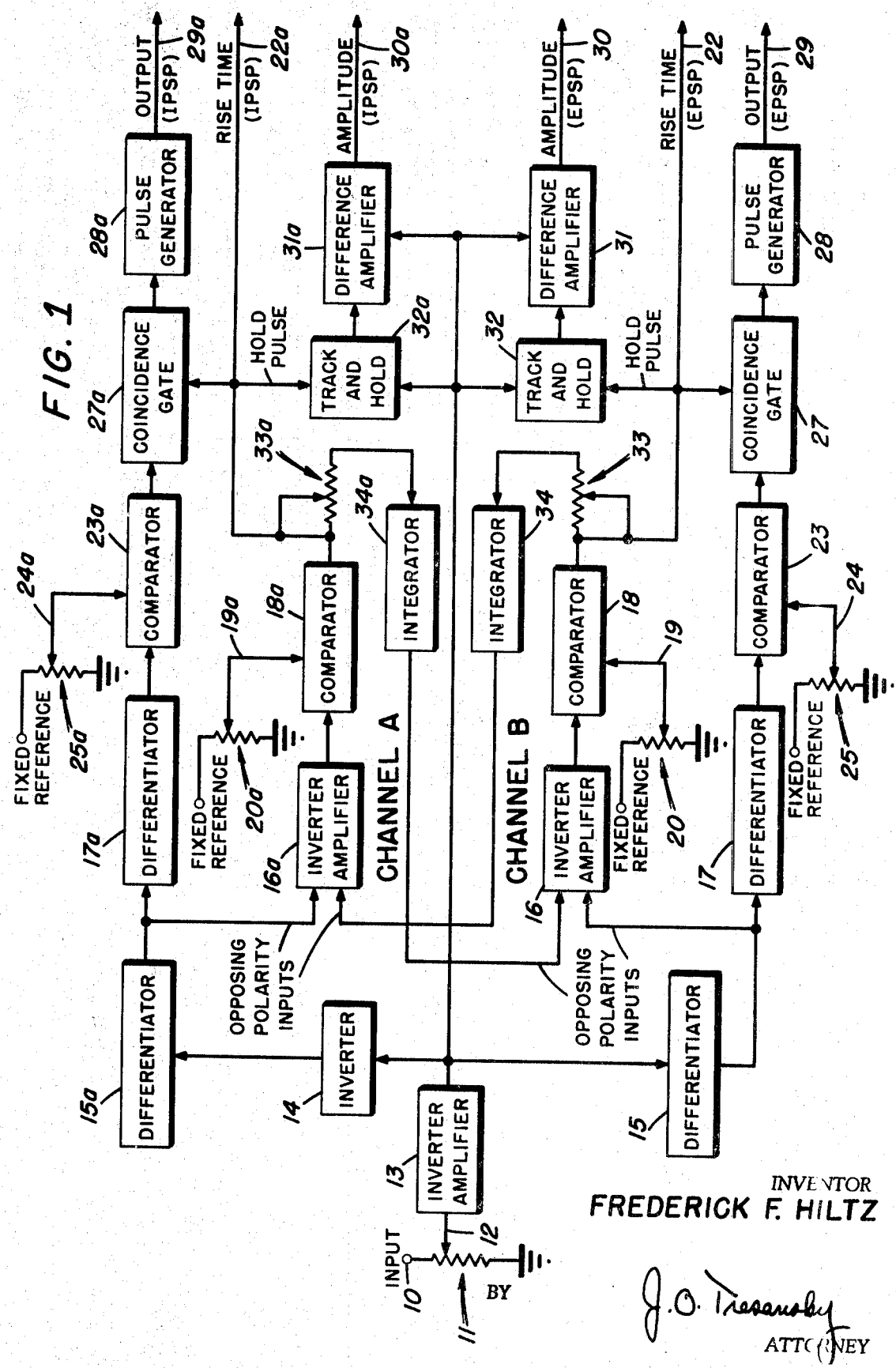
FIG. 1 represents a block diagram of the preferred embodiment of the present invention.

Referring now to FIG. 1 of the drawings, the input, complex pulse data waveform is applied at terminal 10 across the potentiometer 11. As mentioned previously, the input terminal 10 may be connected to any source of complex electrical waveform to be analyzed such as, for example, the postsynaptic potential signal representing the neuronal activity under investigation. The desired portion of the input signal picked off by movable arm 12 of the potentiometer is applied first to an inverter amplifier 13 which inverts and amplifies the input signal to an appropriate signal level. Potentiometer 11 and amplifier 13 together comprise a variable gain.

Figure 2:
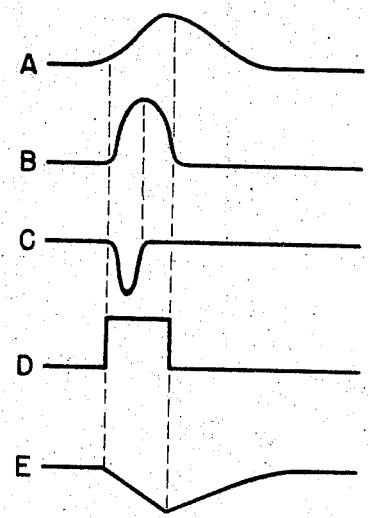
FIG. 2 is a diagram of typical waveforms generated in the apparatus of FIG. 1.

As shown in FIG. 1, the circuit apparatus of the present invention comprises two channels, designated A and B, for detecting and accurately identifying the opposite polarity input pulses contained in the complex waveform applied at input terminal 10. For example, when utilized for investigation of neuronal activity, the channel B might be utilized to detect excitatory postsynaptic potentials, hereinafter referred to as EPSP events or pulses, and channel A utilized to detect the opposite polarity, inhibitory postsynaptic potentials, hereinafter referred to as IPSP events or pulses. A typical excitatory or EPSP pulse might resemble waveform A in FIG. 2. With the exception of inverter 14, in IPSP detection channel A, the two channels A and B contain identical forms of circuitry with the same operating voltages, although time constants and gains within the two channels may differ, depending upon the requirements of practice. Consequently, a description of one channel will more or less suffice to explain the structure and operation of the entire circuit apparatus as shown in the drawings. Moreover, it should be noted that the mere inclusion of inverter 14 functions to make the channels A and B responsive to opposite polarity pulse inputs; e.g., channel B responds to and detects positive input pulses representing excitatory neuronal events and channel A responds to and detects negative input pulses represeting inhibitory neuronal events.

Referring now more specifically to channel B, the output from the inverter amplifier 13 is applied to an active differentiator circuit 15, of conventional design, which performs a first differentiation of the excitatory (EPSP) pulses applied thereto. A typical output of differentiator 15 is shown at waveform B in FIG. 2. The output of the differentiator 15 is then applied, on the one hand, as one input to an inverter amplifier 16 and, on the other hand, to a second active differentiator circuit 17 which may be of construction similar to that of differentiator 15. The differentiator 17 performs a second differentiation of the input EPSP pulses. A typical output from differentiator 17 is illustrated at waveform C in FIG. 2. Dependent upon the response characteristics (slew rates) of the active differentiators, one may desire to limit the output of the differentiators to only one polarity of the differentiated signal, or to a small fraction of the second polarity.

The output of the inverter amplifier 16 is applied to a comparator circuit 18, of conventional design, which has its second input connected to the adjustable arm 19 of a potentiometer 20 connected between a reference potential and ground. The purpose of the comparator 18 is to clip or remove those portions of the output from inverter amplifier 16, which are less than the reference potential on arm 19, for reasons to be described in more detail hereinafter. At the output of comparator 18 appears pulses (see waveform D in FIG. 2) whose respective durations indicate the interval during which the first derivative of the associated input EPSP pulses exceeds the predetermined reference level set by the movable arm 19. In other words, the pulse output of comparator 18 is indicative of the rise time of each excitatory input pulse applied at input terminal 10. As is well-known to those skilled in the art, this rise time output appearing at terminal 22 is often desirable in order to help discriminate various sources of excitatory neuronal (EPSP) events contained in the complex input waveform.

Similarly, the output from the second differentiator circuit 17 is applied to a comparator circuit 23 whose other input is connected to the movable arm 24 of a potentiometer 25. As a result, the output from the comparator 23 are positive pulses whose respective pulse widths indicate the time that the second derivative of the corresponding excitatory input pulses exceeds the value represented by the reference voltage level selected by arm 24. These pulse outputs from comparator 23 are also constant amplitude, variable width output pulses, each indicative of the time interval during which the second derivative of the corresponding EPSP pulse exceeds the predetermined reference value selected at potentiometer 25. These second derivative output pulses from comparator 23 are applied, along with the first derivative output pulse from comparator 18, to a coincidence or AND gate 27. The output of coincidence gate 27 is applied to a pulse generator 28 which produces, at output terminal 29, a fixed amplitude and width output pulse indicating or demarcating the occurrence of an EPSP input pulse only when there is time coincidence between the first and second derivative pulses in the excitatory detection channel B. This insures that what is being demarcated is, in fact, an input excitatory or EPSP pulse. Moreover, by making recognition of an event dependent upon its first and second derivatives, the problems associated with so-called "baseline drift" and often encountered where detection is dependent on amplitude alone are eliminated.

Figure 4:
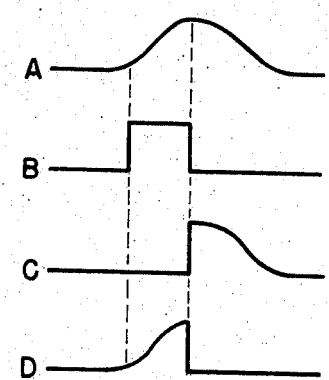
FIG. 4 is a diagram of typical waveforms illustrating how the amplitude of an input signal is monitored.

The actual amplitude of the EPSP pulse inputs is indicated by an output signal (see waveform D in FIG. 4) at terminal 30, the output of a difference amplifier 31. The inputs to the difference amplifier 31 are from inverter 13 (see typical waveform A in FIG. 4) and the track and hold circuit 32. The output of the track and hold 32 is shown in FIG. 4 at waveform C and is the same as inverter 13 output except during the time that the hold pulse (waveform B in FIG. 4) from comparator 18 exists, at which time the output voltage from track and hold 32 is held at the value observed at initial onset of the hold pulse. Various well-known circuits may be employed as the track and hold 32, such as those described at pages 60 and 61 of Applications Manual for Computing Amplifiers, copyrighted 1966 by the George A. Philbrick Researches, Inc., Library of Congress Catalog Card No. 66–19610.

As mentioned previously, the differentiators 15 and 17 may be limited to one polarity of differentiated signal. This would enable better recognition of excitatory pulses when closely stacked one upon the other; i.e., when one EPSP pulse occurs on the trailing edge of a preceeding EPSP pulse, by reducing slew-rate requirements on the active differentiators.

Figure 3:
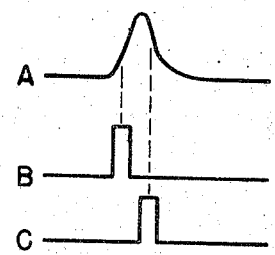
FIG. 3 is a diagram of typical waveforms which might be generated in the absence of an inter-channel blocking voltage.
Figure 5:
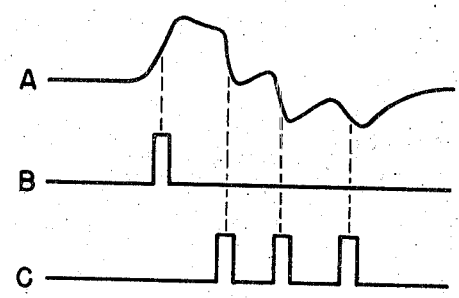
FIG. 5 is a waveform diagram illustrating output pulses demarcating closely spaced input pulses.

As shown in FIG. 1 of the drawings, the rise time output pulse from comparator 18 is applied, through variable resistor 33, to an integrator 34 which can, for example, be of the type described at page 45 of the above-mentioned Applications Manual for Computing Amplifiers. The time constant for the integrator 34 is selected so that it produces a momentary exponentially decreasing voltage waveform which occurs during the trailing edge of an EPSP pulse and which is applied as input to the inverter amplifiers 16a, in the inhibitory detection channel A, in opposing polarity with the normal input to the inverter amplifier 16a derived from the first differentiator circuit 15a. The purpose of this applied opposite polarity voltage from integrator 34 is to tend to block the operation of channel A during the trailing edge of the EPSP input pulse and thereby prevent such trailing edge from giving a faulty indication that an opposite polarity, inhibitory (IPSP) pulse has occurred. If this interchannel blocking voltage were not provided, the presence of an input excitatory EPSP pulse (see waveform A in FIG. 3) might very easily cause an output demarcating pulse to appear from both channels A and B (terminals 29a and 29) as shown respectively at waveforms C and B in FIG. 3. The level and decay time of the integrator 34 output is preferably set, however, such that a legitimate IPSP occurring on the trailing edge of an EPSP is not negated from detection. This capability is represented in FIG. 5, wherein waveform A illustrates the occurrence of an input EPSP pulse, closely followed by three IPSP pulses, and waveforms B and C respectively illustrate the demarcating output pulses produced at terminals 29 and 29a.

As previously mentioned, the inhibitory detection channel A is identical in construction form and operation with the excitatory channel B just described, except for the inclusion of inverter circuit 14 in channel A. Obviously, this will help to make the overall systems apparatus less complex and expensive. In the drawings, the various blocks comprising channel A have therefore been designated with the same reference numerals, with an *a* suffix, as the corresponding blocks already described for channel B.

In summary, the outputs provided by the detection channels B and A includes: output signals (terminals 29 and 29a) demarcating the occurrence of excitatory (EPSP) and inhibitory (IPSP) neuronal events; output signals (terminals 22 and 22a) indicative of the rise time of both excitatory and inhibitory events; and, output signals (terminals 30 and 30a) indicating the amplitude of both the excitatory and inhibitory events. This combination of output signals permits accurate analysis of the input complex pulse waveform.

Having thus described one embodiment of the present invention, it should be understood at this time that various modifications, adaptations and alterations of the present invention are possible in the light of the above teachings without departing from the spirit and scope of the appended claims. In other words, the invention may be practiced otherwise than as specifically described.

What is claimed is:
1. Apparatus for recognizing closely spaced input pulses having the same or opposite polarity initial slope comprising,
- a pair of pulse detection circuit channels associated with and adapted to detect input pulses of opposite polarity initial slope, each of said channels including,
- first and second differentiators means operably connected to provide output signals representing respectively the first and second derivatives of the associated input pulse, and
- a coincidence gate circuit means operably connected to the outputs of said first and second differentiator means for providing an output pulse signal demarcating the occurrence of said associated input pulse only when there is time coincidence between the outputs of said first and second differentiator circuit means.

2. The pulse recognition apparatus specified in claim 1 and further including,
- circuit means interconnecting said pulse detection circuit channels for preventing the trailing edge of an input pulse associated with one circuit channel and having an initial slope of one polarity from so affecting the other circuit channel which detects input pulses having the opposite polarity initial slope as to give a faulty indication that an input pulse with said opposite polarity initial slope has occurred.

3. The apparatus specified in claim 2 wherein said interconnecting circuit means includes,
- an integrator circuit means for each of said detection channels operably connected to receive and integrate the output signal from the first differentiator circuit means included in that same channel upon the occurrence of an input pulse with the associated polarity of initial slope, and
- circuit means operably connected to combine the output of said integrator circuit means in opposing relationship with the output signal from the first differentiator circuit means of the other detection channel; whereby the said other detection channel is momentarily prevented, upon the occurrence of an input pulse with said associated polarity of initial slope, from falsely producing an output pulse demarcating the occurrence of an input pulse with an opposite polarity initial slope.

4. The apparatus specified in claim 1 wherein each detection channel further includes,
- circuit means responsive to the associated input pulse for producing an output pulse signal proportionate to the rise time of each associated input pulse.

5. The apparatus specified in claim 4 wherein said rise time pulse producing circuit means includes,
- a comparator circuit operably connected to the output of said first differentiator circuit means and capable of producing an output pulse whose width is proportionate to the time interval during which the first derivative of said associated input pulse exceeds a predetermined reference level.

6. The apparatus specified in claim 4 wherein each detection channel further includes,
- circuit means responsive to the associated input pulse for producing an output signal whose amplitude varies in proportion to the amplitude of said associated input pulses during the interval between pulse initiation and peak.

7. The apparatus specified in claim 6 wherein said circuit means for producing said amplitude proportionate signal includes,
- circuit means operably connected to receive said associated input pulses and responsive to the output of said rise time pulse producing circuit means for tracking the amplitude of each of said associated input pulses during the rise time of said pulse and producing a signal proportionate to the tracked value of said amplitude during the time interval between initiation and peak of said associated input pulses.

8. The apparatus specified in claim 1 further including for each detection channel,
- circuit means operably connected to each of said first and second differentiator means for indicating those portions of the respective first and second output derivative signals produced thereby which exceed a predetermined reference potential level.

9. The apparatus specified in claim 8 wherein said indicating circuit means includes, at the output of each of said first and second differentiator circuit means,
- a source of variable reference potential, and
- a comparator circuit operably connected to receive and compare the output derivative signal from said associated differentiator circuit means with said reference potential and effective to produce an output pulse signal only when said output derivative signal exceeds said reference potential.

10. The apparatus specified in claim 1 further including,
- an inverter circuit operably connected in only one of said detection circuit channels, at the input thereto, whereby identical circuitry having the same polarity operating potentials may be employed in each of said detection channels.

References Cited

UNITED STATES PATENTS

| | | | |
|---|---|---|---|
| 2,418,127 | 4/1947 | Labin | 328—127 |
| 2,489,297 | 11/1949 | Labin | 328—114 |
| 2,511,564 | 6/1950 | Callan | 328—127 |
| 2,729,809 | 1/1956 | Hester | 328—118 |
| 3,252,098 | 5/1966 | Schlaepfer | 307—268 |

DONALD D. FORRER, Primary Examiner

H. A. DIXON, Assistant Examiner

U.S. Cl. X.R.

307—201, 235, 236; 328—118, 127